United States Patent
Abe et al.

(10) Patent No.: US 8,006,157 B2
(45) Date of Patent: Aug. 23, 2011

(54) RESOURCE-LIGHT METHOD AND APPARATUS FOR OUTLIER DETECTION

(75) Inventors: Naoki Abe, Rye, NY (US); John Langford, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 11/863,704

(22) Filed: Sep. 28, 2007

(65) Prior Publication Data

US 2008/0022177 A1    Jan. 24, 2008

Related U.S. Application Data

(63) Continuation of application No. 10/749,518, filed on Jan. 2, 2004, now Pat. No. 7,296,018.

(51) Int. Cl.
*H04L 1/00* (2006.01)
*G06F 11/30* (2006.01)
*H03M 13/00* (2006.01)

(52) U.S. Cl. .............. 714/746; 714/797; 326/11; 706/1; 706/6

(58) Field of Classification Search ................. 714/746, 714/797; 707/1, 6; 326/11
See application file for complete search history.

(56) References Cited

U.S. PATENT DOCUMENTS

| | | | |
|---|---|---|---|
| 6,405,318 B1 | 6/2002 | Rowland | |
| 6,424,929 B1 | 7/2002 | Dawes | |
| 6,519,604 B1 | 2/2003 | Acharya et al. | |
| 6,643,629 B2 | 11/2003 | Ramaswamy et al. | |
| 6,728,690 B1 | 4/2004 | Meek et al. | |
| 2003/0004902 A1* | 1/2003 | Yamanishi et al. | 706/1 |
| 2003/0204320 A1 | 10/2003 | Arouh et al. | |
| 2003/0236652 A1 | 12/2003 | Scherrer et al. | |
| 2004/0230586 A1 | 11/2004 | Wolman | |

* cited by examiner

*Primary Examiner* — Guy J Lamarre
(74) *Attorney, Agent, or Firm* — Whitham, Curtis, Christofferson & Cook, P.C.; Stephen C. Kaufman

(57) ABSTRACT

Outlier detection methods and apparatus have light computational resources requirement, especially on the storage requirement, and yet achieve a state-of-the-art predictive performance. The outlier detection problem is first reduced to that of a classification learning problem, and then selective sampling based on uncertainty of prediction is applied to further reduce the amount of data required for data analysis, resulting in enhanced predictive performance. The reduction to classification essentially consists in using the unlabeled normal data as positive examples, and randomly generated synthesized examples as negative examples. Application of selective sampling makes use of an underlying, arbitrary classification learning algorithm, the data labeled by the above procedure, and proceeds iteratively. Each iteration consisting of selection of a smaller sub-sample from the input data, training of the underlying classification algorithm with the selected data, and storing the classifier output by the classification algorithm. The selection is done by essentially choosing examples that are harder to classify with the classifiers obtained in the preceding iterations. The final output hypothesis is a voting function of the classifiers obtained in the iterations of the above procedure.

11 Claims, 3 Drawing Sheets count > 40 : 0 (2284.0/13.0)
count <= 40 :
| count <= 0 : 0 (1375.0/1.4)
| count > 0 :
| | srv_count > 53 : 0 (207.0/7.3)
| | srv_count <= 53 :
| | | srv_count <= 0 : 0 (123.0/1.4)
| | | srv_count > 0 :
| | | | serror_rate <= 0.000502569 :
| | | | | dst_host_serror_rate <= 0.0101501 : etc.
| | | | | dst_host_serror_rate > 0.0101501 : etc.
| | | | serror_rate > 0.000502569 : etc.

*FIGURE 3*

RESOURCE-LIGHT METHOD AND APPARATUS FOR OUTLIER DETECTION

CROSS-REFERENCE TO RELATED APPLICATIONS

This application is a continuation of U.S. Ser. No. 10/749,518, filed Jan. 2, 2004, and the complete contents thereof is hereby incorporated by reference.

BACKGROUND OF THE INVENTION

1. Field of the Invention

The present invention generally relates to the art and technology of machine learning and data mining and, more particularly, to outlier detection methods and apparatus which are light on computational resources without sacrificing predictive performance.

2. Background Description

There are certain applications of data mining, for example, in which it is required to classify future examples into normal and abnormal classes based on past data that consist only of normal data. This type of problem is called "outlier detection" or "anomaly detection" and is a form of the so-called unsupervised learning in which no labeled data are available at the training time. Real world problems for which outlier detection is desired include intrusion detection in network data and fraud detection in telecom and financial data.

To date, most existing methods of outlier detection are based on density estimation methods, that is, methods that attempt to estimate the distribution of the normal data, and then use the estimated density model to calculate the probability of each test data, and classify those that receive unusually small probabilities as outliers, and thus as candidates of the class of interest, such as intrusions or frauds.

With this type of method based on density estimation, there has been a problem that the required computational resources are heavy, both in terms of computation time and storage. For example, a representative density estimation method, known as the Parzen window method, estimates the density as the mixture of Gaussians placed around all training data. See, Yueng and Chow, "Parzen-Window Network Intrusion Detectors", *Proc. of the 16th International Conference on Pattern Recognition*, 2002. As such, it requires the storage of all input data points, thus necessitating an amount of storage that grows linearly in the number of data.

In many applications of outlier detection, such as intrusion and fraud detection, the number of data tends to be extremely large, say in tens of millions, and computationally demanding methods are not well-suited, especially those based on storing all past data.

SUMMARY OF THE INVENTION

It is therefore an object of the present invention to provide outlier detection methods and apparatus, whose requirement are light on computational resources, especially on the storage requirement, and yet achieve a state-of-the-art predictive performance.

According to the invention, the outlier detection problem is first reduced to that of a classification learning problem, and then selective sampling based on uncertainty of prediction is applied to enhance predictive performance. The main advantage of the invention is enhanced predictive accuracy, but a significant added advantage is the reduction in sample size. The reduction to classification essentially consists in using the unlabeled normal data as positive examples, and randomly generated synthesized examples as negative examples, the proportion of which can be controlled depending on the relative importance of false negative and false positive prediction errors. The randomly generated synthesized data could be generated in a number of ways, but a simple way is to generate each feature value independently according to the marginal distribution for the feature in question, which can easily be pre-estimated using the real normal data assuming it can be approximated as a normal distribution or some other simple form of probability distribution (e.g., simply by estimating its mean and variance from the data).

Application of selective sampling makes use of an underlying, arbitrary classification learning algorithm, the data labeled by the above procedure, and proceeds iteratively. Each iteration consisting of selection of a smaller subsample from the input data, training of the underlying classification algorithm with the selected data, and storing the classifier output by the classification algorithm. The selection is done by essentially choosing examples that are harder to classify with the classifiers obtained in the preceding iterations. The final output hypothesis is a voting function of the classifiers obtained in the iterations of the above procedure.

The above reduction, if applied without selective sampling, suffers from the potential problem that the synthesized generated negative examples may violate some implicit constraints that are satisfied by all realistic data in the domain, and give away their label too easily (namely, that they are negative, abnormal examples), merely by the fact that they are unrealistic. When this happens, the obtained classifier is likely to be useless, since it can classify the training data perfectly but will not be able to predict the labels of the unseen, future data, which consist only of realistic data. The application of selective sampling based on uncertainty of prediction to the present context has the effect of weeding out such "easy" synthesized examples from the training set, thereby forcing the classification algorithm to learn to separate the normal and abnormal data, not to separate the realistic and unrealistic data. Thus, in addition to the effect of reducing data size generally achieved by the selective sampling methods of the invention, selective sampling applied to the present context of a classification problem transformed from an outlier detection via the proposed reduction serves a crucial role.

As compared to traditional methods of outlier detection, the present invention realizes a high accuracy prediction of outliers in future data, with much smaller computational requirement. In particular, the storage requirement is drastically cut down, since in each iteration only a small fraction of the input data need be stored for the purpose of training the classification algorithm. In addition, it can achieve state-of-the-art prediction performance.

BRIEF DESCRIPTION OF THE DRAWINGS

The foregoing and other objects, aspects and advantages will be better understood from the following detailed description of a preferred embodiment of the invention with reference to the drawings, in which:

FIG. 3 illustrates an example of a decision tree, which could be the output of the classification algorithm in one iteration.

DETAILED DESCRIPTION OF A PREFERRED EMBODIMENT OF THE INVENTION

Figure 1:
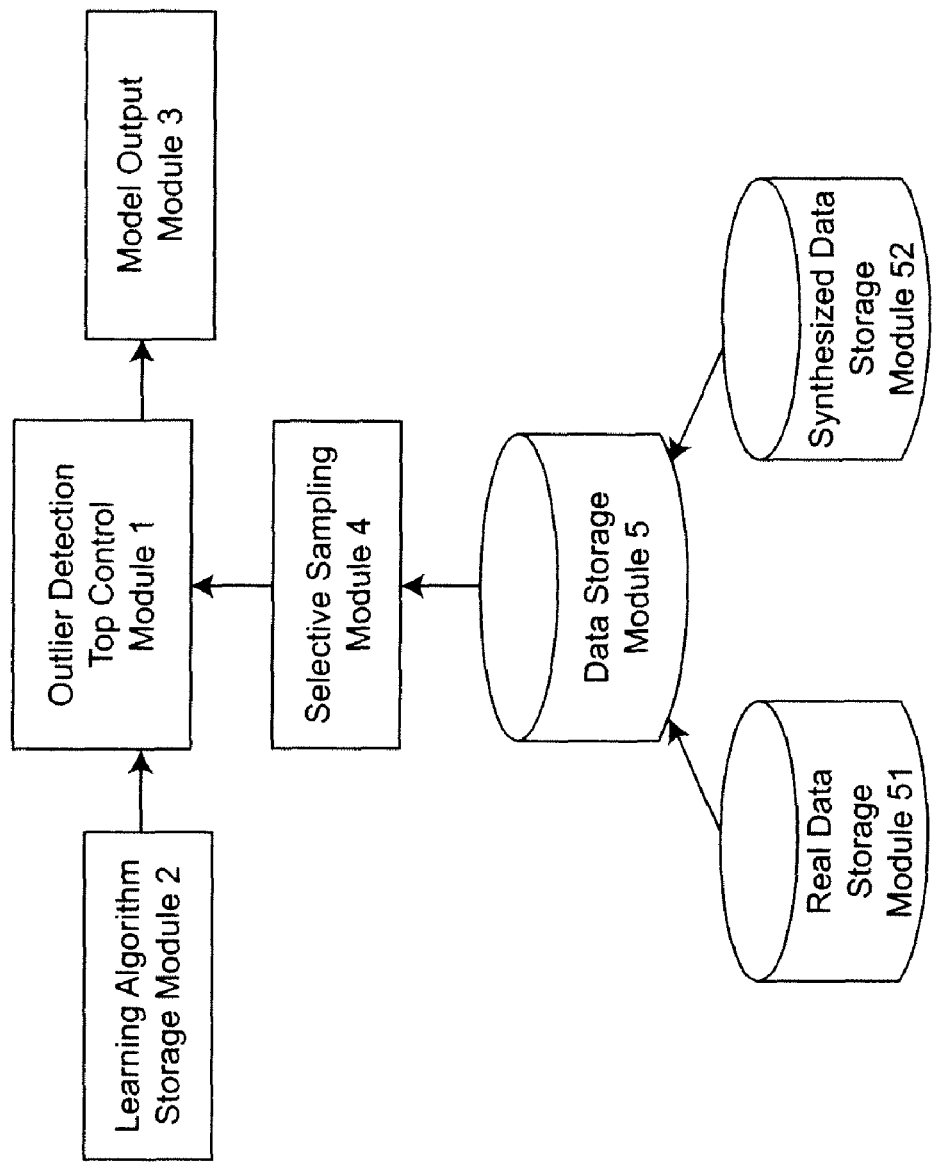
FIG. 1 is a block diagram of a data processing system showing the data flow of the implemented method according to the invention.

Referring now to the drawings, and more particularly to FIG. 1, there is shown a data processing system illustrating the data flow of the implemented method according to the invention. The data processing system comprises a top control module 1, a learning algorithm storage module 2, a model output 3, a selective sampling module 4, and a data storage module 5. The data storage module 5 comprises a real data storage module 51 and a synthesized data storage module 52.

The top control module 1 controls the overall control flow, making use of various sub-components of the system. The learning algorithm storage module 2 stores a representation of an algorithm for classification learning. An arbitrary algorithm for classification can be used here, such as decision tree learning algorithms, naïve Bayes method, logistic regression method and neural network training algorithms. The model output module 3 stores the models obtained as a result of applying the learning algorithm stored in module 2 to training data given by module 4 and outputs a final model by aggregating these models. The selective sampling module 4 accesses the data stored in the data storage module 5, selectively samples a relatively small subset of the data, and passes the obtained sub-sample to module 1. The data storage module 5 may comprise two separate modules, as shown, one for storing real data corresponding to "normal" data, and the other for storing synthesized data corresponding to "abnormal" data. Those skilled in the art will understand that a single, physical data storage module may be used instead of two by means of partitioning, providing two logical data storage modules in a single physical data storage module.

The first aspect in the process implemented on the data processing system of FIG. 1 is that of reducing the outlier detection problem to that of a classification learning problem. This is done by using input data (normal examples) as "positive" examples and randomly generated synthesized examples as "negative" examples. Then a classification rule is learned from the obtained data.

Classification learning is one of the most well studied problems in learning, as found in many references in the literature. See, for example, Chapters 2 and 4 of *The Elements of Statistical Learning* by T. Hastie, R. Tibshirani and J. Friedman, published by Springer 2001. As described in this reference, classification and regression are two forms of "supervised learning", in which the learner's goal is to estimate a function given finite training data, that is, pairs representing members of some domain and their (possibly noisy) function values. Classification refers to the case in which the function to be learned is a binary function, namely one that maps the domain into a set of two labels, such as "normal" and "abnormal".

The second aspect in the process implemented on the data processing system of FIG. 1 is that of applying selective sampling based on uncertainty of prediction to enhance the predictive accuracy and to reduce the amount of data required for data analysis. This is done by iteratively selecting data that are "hard to classify" to train the classifier. Then, all classifiers are aggregated to make a final prediction. This process has the effect of weeding out synthesized positive examples that are "unrealistic" and too easy to classify (and which do not help in identification of outliers in future test data).

The method implemented on the data processing system shown in FIG. 1 has the advantage of computational efficiency, since in general, classification is easier than density estimation. Classification with selective sampling requires few data and is extremely memory-light.

Figure 2:
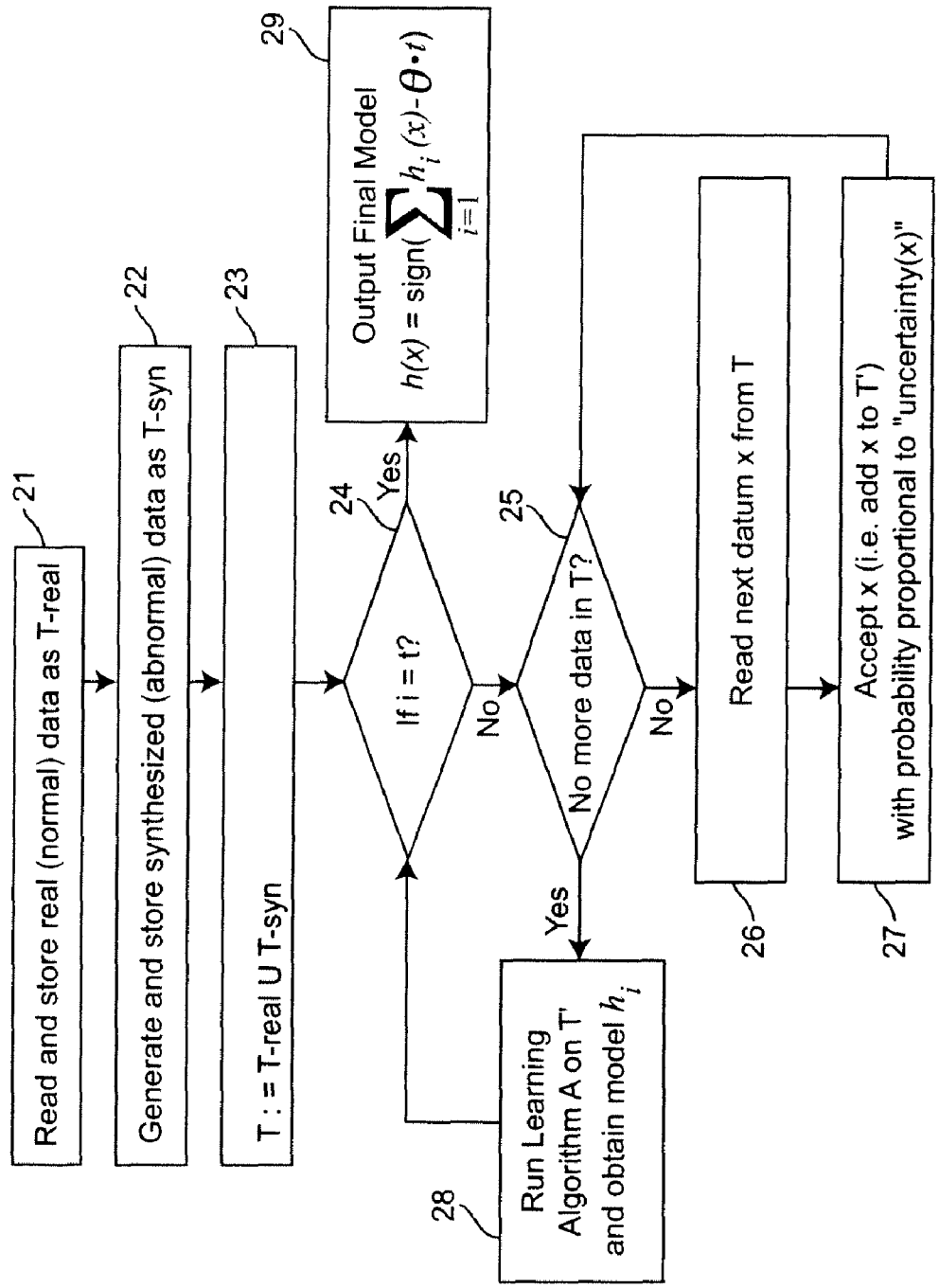
FIG. 2 is a flow chart showing the process implemented by the invention.

The process implemented by the data processing system shown in FIG. 1 is shown in the flow chart of FIG. 2. The process begins in step 21 where real ("normal") data is read and stored as T-real. In step 22, synthesized ("abnormal") data is generated and stored as T-syn. The outlier detection begins at step 23 for Learner A, Data T-real, and count t, where Data T=T-real∪T-syn. Step 24 is a decision block which controls the iteration from i=1 to t. If i is not equal to t, then a determination is made in a second decision block at step 25 to determine if there is more data in T. If not, selective sampling of data in data storage modules 51 and 52 is done in steps 26 and 27, respectively, to generate selectively sampled data T', where T' is selectively sampled from data T with sampling probability equaling a measure of uncertainty of prediction for the example or, alternatively, sampling probability proportional to the product of a measure of uncertainty and a measure of cost of mis-classifying the same example. In this process of selective sampling, the given data is scanned and, as the data is scanned, the decision of whether to accept each datum is made independently and with acceptance probability proportional to a measure of uncertainty associated with that example. Only those data that are accepted are stored. The selectively sampled and stored data is returned to step 25, after which, in step 27, the learning algorithm A is run on data T' to obtain model $h_i$ (i.e., $h_i$=A(T')). The index i of the iteration is incremented by one, i.e., i=i+1, and a return is made to decision block 24. When the iteration is complete, the final model is output at step 27 as h(x)=sign $$h(x) = \text{sign}\left(\sum_{i=1}^{t} h_i(x) - \theta \cdot t\right).$$

A number of variations are possible in the exact specification of the selective sampling procedure, including one which is described below. The uncertainty of a given element of the domain, x, is defined using what is known as the "margin" for that example x, given by all the models obtained in the iterations so far. Letting $h_i$, i=1, ..., s denote the models obtained so far. Here each model is a "classifier", that is, a representation of a function that maps elements of the domain to a set of two labels. Without loss of generality, here it is assumed that the two labels are −1 and +1. Then, the margin for a domain element, x, given a set of models, $h_i$, i=1, ..., s, is defined as the absolute value of the sum of $h_i(x)$, i=1, ..., s. Note that the high margin indicates higher confidence of prediction by the models. Given the margin for x, written m(x), a good measure of uncertainty of prediction for x can be obtained in at least two ways. One is to define the uncertainty for x, u(x), as the binomial probability for obtaining (s+m(x))/2 successes in s Bernoulli trials, each with success probability of a half. More specifically, $$\text{Binomial}\left(s, \frac{s+m(x)}{2}\right) = \frac{s!}{((s+m(x))/2)!(s-m(x)/2)!}\left(\frac{1}{2}\right)^s$$

A second method, which is an approximation of the first method, is to define u(x) as the probability of obtaining (s+m(x))/2 or greater, with respect to the Gaussian distribution with mean s/2 and standard deviation (√s)/2. More specifically, $$\text{gauss}\left(\frac{s}{2}, \frac{\sqrt{s}}{2}, \frac{s+m(x)}{2}\right) = 1 - \int_{-\infty}^{s+m(x)/2} \frac{1}{\sqrt{s\pi/2}}\exp\left\{-\left(y-\frac{s}{2}\right)^2/s\right\}dy$$

It is also possible to use a sampling probability which is proportional to the product of a measure of uncertainty and a measure of cost. That is, the sampling probability for an example x may be set proportional to u(x) times c(x), where u(x) is the same as defined above and c(x) is the cost of mis-classifying the example x. For example, in the example of network intrusion detection, the cost of mis-classifying an intrusion as a normal connection may be one hundred times more costly (in terms of economical loss to the party interested in intrusion detection) than that of mis-classifying a normal connection as an intrusion. If that is the case, for an example x, which is labeled as "abnormal" in the training data, the value of the cost would be c(x)=100, whereas for the same example x, which is labeled as "normal" in the training data, the value of the cost would be c(x)=1. It is possible to set the sampling probability proportional to u(x) times c(x), for example, by inspecting the maximum possible value, M, of u(x) times c(x) is in a moderately sized sample, and then dividing the product u(x)×c(x) for each x by M.

As a concrete example of applying the proposed method to a real world problem, we describe an application to network intrusion detection. Network intrusion detection has recently become a proto-typical application problem for outlier detection. This is because in this application it is difficult to collect a large set of examples of intrusions, and furthermore the nature of intrusions keep changing and thus it is not always possible to detect new intrusions based on past patterns of intrusions.

A network intrusion detection system based on the proposed method/system for outlier detection consists of the following steps:

1) Convert past network connection data to a set of feature vectors, by mapping information on a network connection to a feature vector.
2) Apply the method according to the invention to the above data set, and obtain an outlier detection rule.
3) Convert new network connection data to feature vectors, apply the above outlier detection rule to them, and flag as "suspicious" those connections corresponding to feature vectors that are classified as "outliers".

A typical set of features used to transform connection data into a well-defined feature vector is those used in the network intrusion data set known as the "KDD CUP 99" data, which is publically available at http://kdd.ics.uci.edu/databases/kddcup99/kddcup99.html. Here is the list of features in this data set (given in three separate tables.)

TABLE 1

BASIC FEATURES OF INDIVIDUAL TCP CONNECTIONS

| feature name | description | type |
| --- | --- | --- |
| duration | length (number of seconds) of the connection | continuous |
| protocol_type | type of the protocol, e.g. tcp, udp, etc. | discrete |
| service | network service on the destination, e.g., http, telnet, etc. | discrete |
| src_bytes | number of data bytes from source to destination | continuous |
| dst_bytes | number of data bytes from destination to source | continuous |
| flag | normal or error status of the connection | discrete |
| land | 1 if connection is from/to the same host/port; 0 otherwise | discrete |
| wrong_fragment | number of "wrong" fragments | continuous |
| urgent | number of urgent packets | continuous |

TABLE 2

CONTENT FEATURES WITHIN A CONNECTION SUGGESTED BY DOMAIN KNOWLEDGE

| feature name | description | type |
| --- | --- | --- |
| hot | number of "hot" indicators | continuous |
| num_failed_logins | number of failed login attempts | continuous |
| logged_in | 1 if successfully logged in; 0 otherwise | discrete |
| num_compromised | number of "compromised" conditions | continuous |
| root_shell | 1 if root shell is obtained; 0 otherwise | discrete |
| su_attempted | 1 if "su root" command attempted; 0 otherwise | discrete |
| num_root | number of "root" accesses | continuous |
| num_file_creations | number of file creation operations | continuous |
| num_shells | number of shell prompts | continuous |
| num_access_files | number of operations on access control files | continuous |
| num_outbound_cmds | number of outbound commands in an ftp session | continuous |
| is_hot_login | 1 if the login belongs to the "hot" list; 0 otherwise | discrete |
| is_guest_login | 1 if the login is a "guest"login; 0 otherwise | discrete |

TABLE 3

TRAFFIC FEATURES COMPUTED USING A TWO-SECOND TIME WINDOW

| feature name | description | type |
| --- | --- | --- |
| count | number of connections to the same host as the current connection in the past two seconds Note: The following features refer to these same-host connections. | continuous |
| serror_rate | % of connections that have "SYN" errors | continuous |
| rerror_rate | % of connections that have "REJ" errors | continuous |
| same_srv_rate | % of connections to the same service | continuous |
| diff_srv_rate | % of connections to different services | continuous |
| srv_count | number of connections to the same service as the current connection in the past two seconds Note: The following features refer to these same-service connections. | continuous |
| srv_serror_rate | % of connections that have "SYN" errors | continuous |
| srv_rerror_rate | % of connections that have "REJ" errors | continuous |
| srv_diff_host_rate | % of connections to different hosts | continuous |

As a result of applying the outlier detection method to a data set consisting of these features, using a decision tree algorithm as the "classification learning algorithm" stored in module 2, one obtains as the outlier detection rule, a voting function over a number of decision trees, such as the tree shown in FIG. 3.

While the invention has been described in terms of a single preferred embodiment, those skilled in the art will recognize that the invention can be practiced with modification within the spirit and scope of the appended claims.

The invention claimed is:
1. A method for outlier detection, comprising:
receiving a plurality of real sample vectors, each real sample vector representing a detected real event;
synthesizing a plurality of random state vectors, each random state vector having a randomly generated value;

forming a learning set of candidate sample vectors, consisting of a plurality of said random state vectors and a plurality of said synthesized random state vectors;

generating a first classifier for classifying said candidate sample vectors between being an outlier or a non-outlier;

forming a set of classifiers for classifying candidate sample vectors from among said set of candidate sample vectors between being an outlier or a non-outlier, said forming including initializing said set of classifiers as said first classifier, and adding additional classifiers to said set by repeated iterations, each iteration including
generating, for each of said candidate sample vectors, a set of classification results based on said set of classifiers,
generating, for each of said candidate sample vectors, a classification uncertainty value, said value reflecting a comparative number, if any, of the classification results indicating the candidate sample as being an outlier to a number, if any, of the classification results indicating the candidate sample as being a non-outlier,
updating the learning set of candidate sample vectors by accepting candidate sample vectors for keeping in the updated learning set based on the vector's classification uncertainty value, wherein said accepting is such that a candidate sample vector's probability of being accepted into said updated learning set is proportional to the candidate sample vector's classification uncertainty value, and wherein the population of said updated learning set of candidate sample is substantially lower than the population of the learning set of candidate prior to the updating,
generating another classifier based on said learning data set,
updating said set of classifiers to include said another classifier, and
repeating said iteration until said set of classifiers includes at least t members;
generating an outlier detection algorithm based on said set classifiers; and
classifying subsequent sample vectors based on said outlier detection algorithm.

2. The method of claim 1, wherein said updating includes calculating a sampling probability value for each of said candidate sample data based on the classification uncertainty value, and
wherein said accepting candidate sample vectors for keeping in the updated learning set is based on the vector's sampling probability value.

3. The method of claim 2, wherein said accepting accepts for keeping in the updated learning set of candidate sample vectors only candidate sample vectors having a sampling probability meeting a given threshold.

4. The method of claim 2, further comprising:
receiving a given mis-classifying cost data associated with at least one of said candidate sample vectors, representing a cost of said outlier detection algorithm mis-classifying said at least one candidate sample vector, and
wherein said calculating a sampling probability value for said at least one of said candidate sample vector is further based on said mis-classifying cost data.

5. The method of claim 1, wherein each real sample vector has plurality of feature fields, each feature field having a corresponding detected event feature value, and wherein each synthesized random state vector has said plurality of feature fields, at least one of said feature fields being a randomly generated number.

6. The method of claim 4, wherein said calculating a sampling probability value for said at least one of said candidate sample vector is based on a product of the vector's classification uncertainty value and said mis-classifying cost data.

7. The method of claim 1, further wherein said generating an outlier detection algorithm generates the outlier detection algorithm such that said algorithm applies an aggregate of members of said set of classification algorithms, calculates a corresponding set of detection result data representing each of said aggregate's member's classification, and applies a voting scheme to said corresponding set of detection result data.

8. A system for classifying externally detected samples as one of at least normal and an outlier, comprising:
a machine controller having a readable storage medium;
a machine-readable program code, stored on the machine-readable storage medium, having instructions to:
receive a plurality of real sample vectors, each real sample vector representing a detected real event;
synthesize a plurality of random state vectors, each random state vector having a randomly generated value;
form a learning set of candidate sample vectors, consisting of a plurality of said random state vectors and a plurality of said synthesized random state vectors;
generate a first classifier for classifying said candidate sample vectors between being an outlier or a non-outlier;
form a set of classifiers for classifying candidate sample vectors from among said set of candidate sample vectors between being an outlier or a non-outlier, said forming including initializing said set of classifiers as said first classifier, and adding additional classifiers to said set by repeated iterations,
each iteration including
generating, for each of said candidate sample vectors, a set of classification results based on said set of classifiers,
generating, for each of said candidate sample vectors, a classification uncertainty value, said value reflecting a comparative number, if any, of the classification results indicating the candidate sample as being an outlier to a number, if any, of the classification results indicating the candidate sample as being a non-outlier,
updating the learning set of candidate sample vectors by accepting candidate sample vectors for keeping in the updated learning set based on the vector's classification uncertainty value, wherein said accepting is such that a candidate sample vector's probability of being accepted into said updated learning set is proportional to the candidate sample vector's classification uncertainty value, and wherein the population of said updated learning set of candidate sample is substantially lower than the population of the learning set of candidate prior to the updating,
generating another classifier based on said learning data set,
updating said set of classifiers to include said another classifier, and
repeating said iteration until said set of classifiers includes at least t members;
generate the outlier detection algorithm based on said set classifiers; and classify subsequent sample vectors based on said outlier detection algorithm.

9. The system of claim 8, wherein said machine-readable program code instructions for updating includes instructions for calculating a sampling probability value for each of said candidate sample data based on the classification uncertainty value, and wherein said accepting candidate sample vectors for keeping in the updated learning set is based on the vector's sampling probability value.

10. The system of claim 9, wherein said machine-readable program code includes instructions for receiving a given mis-classifying cost data associated with at least one of said candidate sample vectors, representing a cost of said outlier detection algorithm mis-classifying said at least one candidate sample vector, and wherein said machine-readable program code includes instructions for calculating a sampling probability value for said at least one of said candidate sample vector are such that said sampling probability value is further based on said mis-classifying cost data.

11. The system of claim 10, wherein said machine-readable program code instructions for generating an outlier detection algorithm are such that said algorithm applies an aggregate of members of said set of classification algorithms, calculates a corresponding set of detection result data representing each of said aggregate's member's classification, and applies a voting scheme to said corresponding set of detection result data.

* * * * *